United States Patent [19]

Munson

[11] 3,731,075

[45] May 1, 1973

[54] AUTOMATIC RATE TRACKER

[75] Inventor: John C. Munson, Silver Spring, Md.

[73] Assignee: The United States of America as represented by the Secretary of the Navy

[22] Filed: June 29, 1962

[21] Appl. No.: 206,526

[52] U.S. Cl....................235/181, 324/77 G, 328/92
[51] Int. Cl..............................................G06f 15/34
[58] Field of Search........................343/100.7, 114.5, 343/100 CL; 328/37, 39, 41, 43, 59, 92, 95; 235/92, 181, 177; 340/351; 324/77, 77 G

[56] References Cited

UNITED STATES PATENTS 3,564,596    2/1971    Pryor, Jr...............................235/181

Primary Examiner—Benjamin A. Borchelt
Assistant Examiner—H. A. Birmiel
Attorney—Q. B. Warner and R. F. Hossfeld

EXEMPLARY CLAIM

7. In a signal position determining means for determining the exact position of the maximum correlation in a correlation function signal cycle obtained from a correlation circuit for comparing equally spaced pulses indicative of polarity samples of two different input waveforms, said correlation circuit producing a coincidence or a non-coincidence pulse for each comparison, decision circuit comprising gate timing means for generating a pair of gate intervals of equal time duration on either side of the approximate position of maximum correlation, coincidence gate means connected to said timing means for passing a coincidence pulse therethrough for each polarity coincidence occurring during one of said gate intervals, anti-coincidence gate means connected to said timing means for passing a non-coincidence pulse therethrough for each polarity non-coincidence occurring during the other of said gate intervals, decision counter means being connected to said first and second gate means to count the pulses passed through both said gates, whereby the number of pulses counted by said counter means during said first and second gate intervals is indicative of the position of said gate intervals with relation to said maximum correlation position.

8 Claims, 4 Drawing Figures

Patented May 1, 1973

INVENTOR.
JOHN C. MUNSON

BY *Hodges* ATTYS.
*Lewis McDalsaun*

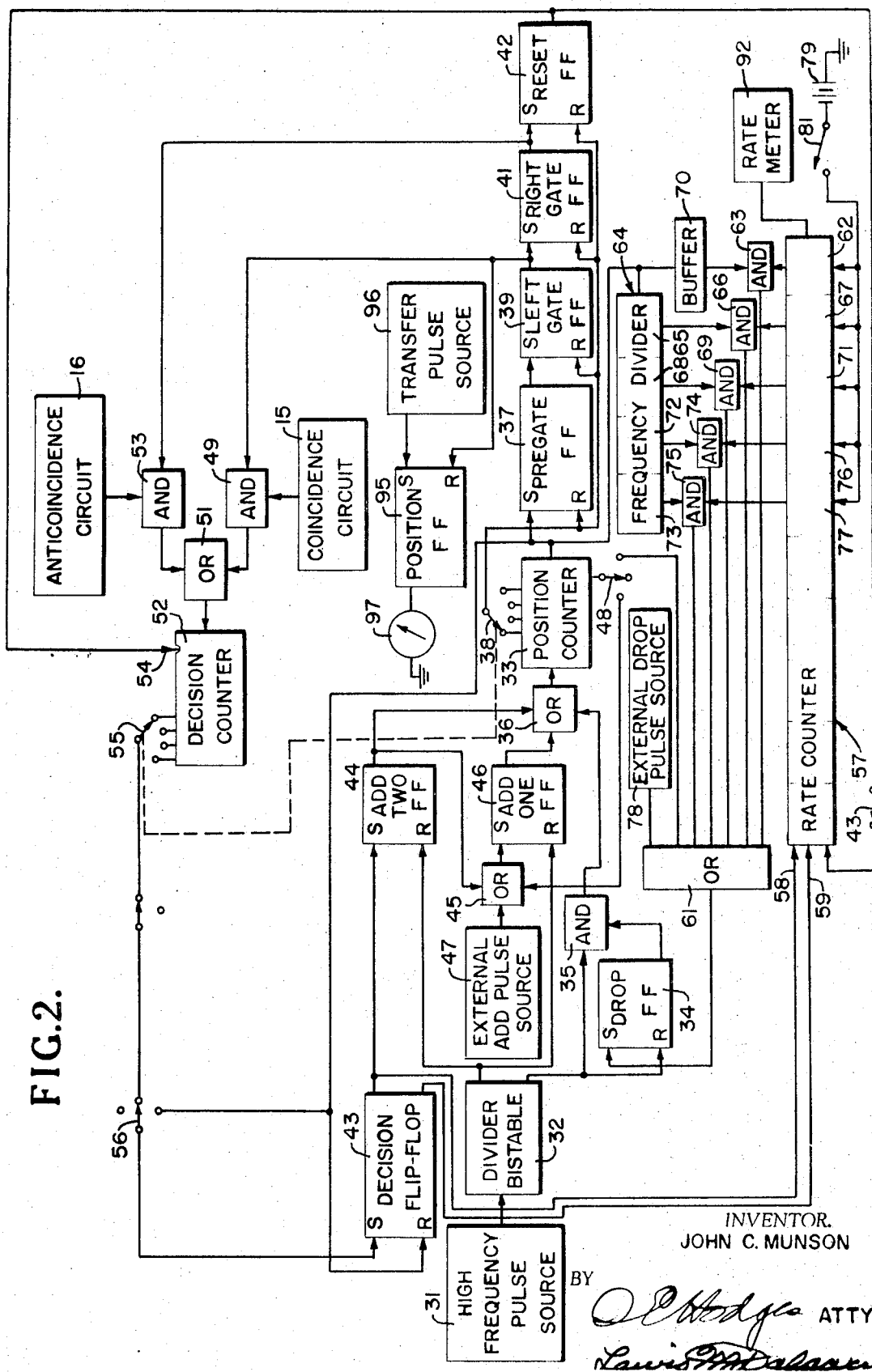

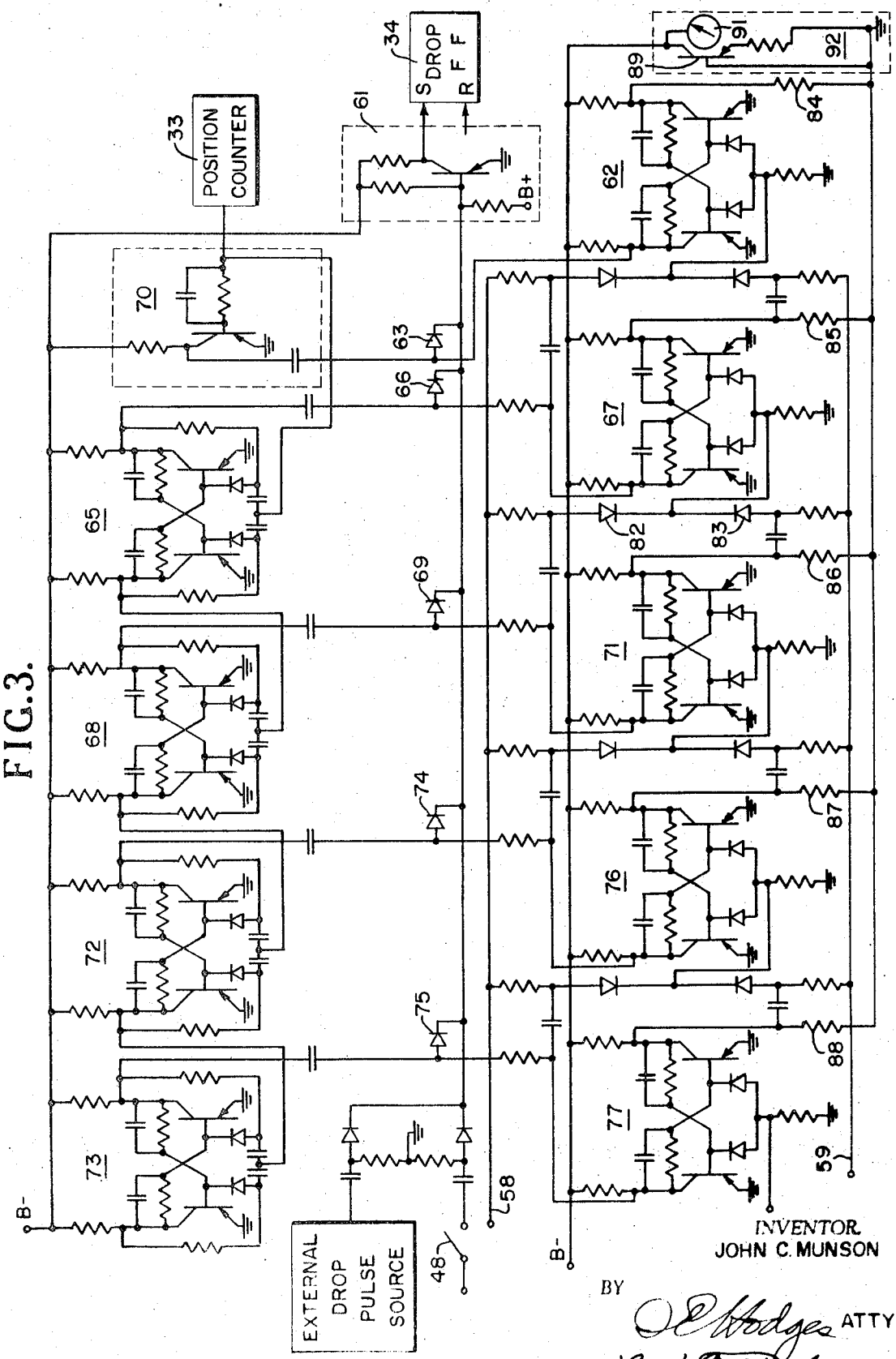

AUTOMATIC RATE TRACKER

The invention described herein may be manufactured and used by or for the Government of the United States of America for governmental purposes without the payment of any royalties thereon or therefor.

This invention relates to an automatic tracker for following and indicating the time position of a signal peak in a regularly occurring signal cycle, such as a correlation function.

In certain types of detection systems, it is necessary to obtain the time difference between two received signals, which are essentially identical in waveform which may be almost obscured by noise. One of the methods of determining this time difference is by polarity coincidence correlation. In this method two given portions of the incoming alternating signals are sampled at regular intervals to determine the polarity of the signals at those points and a digital pulse indication of the polarity of the signal at each of these points is produced. The polarity indications for each of the signals are then placed in separate circulating memories and a small delay is introduced into one of the circulating memories. Each of these memories is then attached to a coincidence circuit which produces an indication of agreement or disagreement in polarity as the digital pulses from each circulating memory are compared one by one. The slight delay in one of the circulating memories causes that series of pulses to be shifted in time with respect to the series of pulses in the other circulating memory once during each complete circulation thereof. Thus, the series of pulses in one memory is shifted continuously with respect to the other memory series until the two series have been compared in a number of possible time positions with respect to one another; the number of polarity agreements sensed by the coincidence circuit in a given circulation will be largest during the particular circulation in which the delay of one series is equal to the time displacement between the two signals. The output of the coincidence circuit may be integrated for each circulation of the pulse series to show the particular circulation, which produces the greatest coincidence between the two signals. If the output from the integrator is smoothed by appropriate circuitry the device will produce an analog signal known as an analogue correlation function whose peak is indicative of the time difference between the two signals.

An automatic target signal tracker, described in a previous application Ser. No. 127,068, now U.S. Pat. No. 3,160,849 filed July 26, 1961 by John C. Munson, was previously developed to follow the peak of the analog signal which resulted from the analogue correlation function. This system provides a tracking gate with an appropriate width which was split into two equal parts. The areas of the peak within the two halves of the gate were compared and an error signal was generated. This error signal was either positive or negative in polarity depending on whether the peak was to the right or to the left of the center of the entire gate, and the polarity of the error signal caused the gate to move a fixed amount, independent of the magnitude of the error, in the direction which would decrease the error. Incremental movements were made to correct the gate position as frequently as a complete correlation function was generated. When the peak of the analogue correlation function was changing, the tracking gate was required to lag the position of the peak in order to make enough correct decisions to follow it. This lag depended upon the signal-to-noise ratio, the size of the fixed amount by which the gate was moved each time, and the rate of change of the position of the peak in the correlation function. This lag effect caused sufficient error between the indicated position and the true position of the correlation function peak to make elimination of this lag necessary in certain applications.

It is an object of this invention to provide a rate compensating tracker which will follow without lag the position of the peak of a correlation function where the time difference between two signals is changing at a constant rate.

A further object of this invention is to provide a digital rate tracker which operates to follow the changing time difference between two signals without significant lag.

Various other objects and advantages will be apparent from the following description of several embodiments of the invention, and the most novel features will be particularly pointed out hereinafter in connection with the appended claims.

In the accompanying drawings:

FIG. 2 is a block diagram representation of an embodiment of the automatic rate tracker of the present invention which illustrates the essential components thereof;

FIG. 3 is a partial illustration of the detailed circuitry involved in the rate counter and drop frequency generator of FIG. 2.

Figure 1:
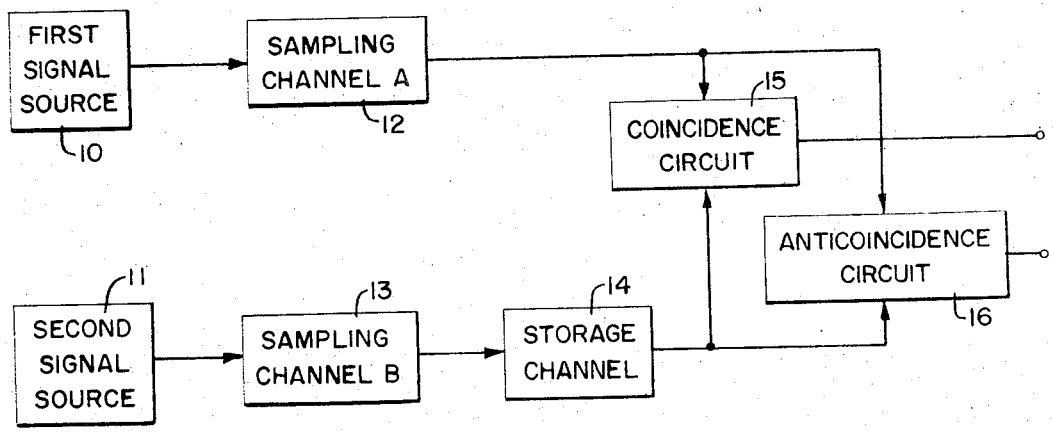
FIG. 1 illustrates a simplified example of a signal correlating circuit with which the automatic rate tracker of the present invention may be used.

In the simplified correlation circuit of FIG. 1, a single low frequency analog signal waveform is produced both by the first signal source 10 and the second signal source 11. These signal sources 10 and 11 produce identical waveforms except for noise and the fact that the two waveforms may be displaced in time phase from one another; for example, these sources may comprise sound transducers which are physically separated in space but receive sound waves from a single sound source at some acute angle to the line of the sound transducers. The sound waves from this source may be obscured by a substantial noise background which is also picked up at each transducer. Both of these signals from the sources 10 and 11 are fed into different channels of a correlating circuit known in the art as a DELTIC correlator, and is described in detail by the U.S. Pat. No. 2,958,039 that issued to V.C. Anderson on Oct. 25, 1960. The low frequency signal from the first signal source 10 is fed to the input of the sampling channel A 12 to be converted to a high frequency recirculating pulse train. Another sampling channel B 13 converts the low frequency signals from the second signal source 11 into the high frequency circulating pulse train in the identical manner of the sampling channel A 12. Each of the sampling channels 12 and 13 operates to sample the polarity of the respective incoming low frequency signal at certain spaced intervals of time and produce a digital pulse representation of the instantaneous sampled polarity. The digital pulse train is then circulated in each of the sampling channels with a certain recirculation period P and on each recirculation the oldest of the signal samples in the circulating pulse train is removed and a new signal sample is inserted into its place; this is commonly known in the art as a moving time series.

In addition to the two sampling channels 12 and 13 is a storage channel 14. This storage channel 14 receives a pulse train from the sampling channel B at a given time and recirculates this pulse train a predetermined number of times unchanged with a recirculation period which is one pulse period longer than the recirculating time of each of the sampling channels. The pulse train in the storage channel 14 is commonly known in the art as a stationary time series since the oldest pulse in the train is not removed and replaced during the recirculation thereof, but the original pulse train inserted remains therein until it is replaced completely by another pulse train from the sampling channel. The fact that the recirculation period of the storage channel 14 is one pulse period longer than that of the sampling channel A causes the pulse train in the storage channel 14 to precess by one pulse period for each complete recirculation thereof with respect to the circulating pulse trains in the sampling channels.

The output of the sampling channel A and the output of the storage channel 14, which are the pulse trains contained therein, are fed to a coincidence circuit 15 and an anti-coincidence circuit 16 wherein a comparison is made of the respective pulses from the sampling and storage channels. As each pulse from the sampling channel A is compared with a pulse occurring from the output of the storage channel 14, an output is obtained either from the coincidence circuit 15 or the anti-coincidence circuit 16. Since the pulse train in the storage channel 14 precesses with respect to the pulse train in the sampling channel A, a comparison of the stationary time series in the storage channel is made with the moving time series in the sampling channel in a number of different relative time positions. When the pulse train in the storage channel 14 has precessed an amount of time equal to the time phase between the signal received by the first signal source 10 and that received by the second signal source 11, the outputs from the coincidence circuit 15 will be most frequent and the outputs from the anti-coincidence circuit 16 will be the least frequent.

After a predetermined number of pulse train comparisons have been made by the correlator with one given pulse train in the storage channel 14, this pulse train may be erased therefrom and another stationary time series introduced thereto from the sampling channel B. The outputs from the coincidence and anti-coincidence circuits 15 and 16 are known as a correlation function and a single correlation period is equal to the total recirculations of a stationary time series within the storage channel 14 before it is changed.

The simplified DELTIC correlation circuit illustrated in FIG. 1 and explained herein does not form a part of this invention but is only offered to aid in the understanding of the automatic rate tracker which is the subject of this invention. A more complete explanation of the DELTIC correlation circuit is found in the aforementioned patent to V. C. Anderson. It will be assumed for the purposes of describing the rate tracker of FIG. 2 that the DELTIC correlator circuit compares the individual pulses in the pulse train at a 9.84 megacycle rate and generates a complete correlation function at the rate of 37.6 cycles per second.

The automatic rate tracker of this invention essentially inserts information into the tracker in a closed loop manner. From this information, the tracker builds up an estimate of the bearing rate which it keeps adjusting on the basis of comparison of the estimated target position with the apparent instantaneous position of the target signals by means of decision elements. The constantly adjusted bearing rate is fed to the tracker to move a tracking gate accordingly to coincide with the target signal. In this manner, constant bearing rates are taken care of automatically by the tracker and the position keeping decision elements, which position the tracking gate, are relieved of this responsibility and can concentrate on actual or apparent deviations from the steady bearing rate.

Referring now to FIG. 2, a high frequency pulse source 31 delivers clock pulses at a rate of 2.46 megacycles to trigger a frequency divider bistable circuit 32; the two halves of the bistable 32 change state at the rate of 1.23 megacycles and are 180° out of phase. An output from each half is provided so that an add phase and a drop phase may be generated thereon. The drop phase generates the pulses which are normally passed to a position counter 33 while the add phase is normally not passed but permits the addition of pulses between the ones occurring from the drop phase. The pulses from the drop phase of the divider bistable 32 are applied to the reset terminal of the drop flip-flop 34, the output of which maintains the AND gate 35 open as long as it is in the reset state. The drop phase pulses are also delivered to the input of the AND gate 35 so that when this gate is open these pulses are passed therethrough to an OR gate 36 whose output is connected to the input of the position counter 33.

The position counter 33 is composed of 15 binary counter stages of any of the well known types which can accurately count the input pulses. The 15 binary stages of the position counter reduce the 1.23 megacycle pulses to a frequency of 37.6 cycles per second at the output thereof. Thus an output pulse is delivered from the last stage of the position counter approximately every 26.6 milliseconds if the drop phase pulses from the divider flip-flop 32 are allowed to enter the position counter uninterrupted. This last stage pulse is used to the set terminal of a pre-gate flip-flop 37, which remains in the set position until a pulse is received at its reset terminal; the reset pulse is obtained from one of the earlier stages in the position counter by attaching the tap 38 to the output thereof. Assuming now that the tap 38 is attached to the output of the sixth counter stage from which pulses occur at a 19.2 kilocycle frequency, the pre-gate flip-flop 37 will remain in the set condition for a period of 52 microseconds. When the pre-gate flip-flop 37 is reset, an accurately timed pulse is delivered thereby to the set terminal of the left gate flip-flop 39 which is in turn reset by the pulses from the tap 38 after 52 microseconds. The right gate flip-flop 41 is set by the reset of left gate flip-flop 39 and is reset by the 19.2 kilocycle pulse. In this manner a left and a right gate pulse, each 52 microseconds in duration, are generated with the trailing edge of the left gate substantially coincident with the leading edge of the right gate. When the right gate flip-flop 41 is reset, a pulse is delivered to set the reset flip-flop 42, which is also reset after 52 microseconds by the 19.2 kilocycle pulse from the counter tap 38.

It is helpful at this time to consider the gate positioning logic, which is effective to add or drop pulses from the regular pulse sequence of the 1.23 megacycle drop phase pulses from the divider flip-flop 32. The essential purpose of the automatic rate tracker is to align the left gate and the right gate on either side of the point in the correlation function at which the maximum agreements occur. This point of time will vary with respect to the beginning of a correlation function in accordance with the variation of the time difference between the signals generated by the signal sources 10 and 11. The position of the tracking gates generated by the gate flip-flops 39 and 41 will be determined by the time required for the position counter 33 to complete a full count. By adding additional counts or pulses to the position counter the time required for a full count may be shortened thus moving the gate effectively to the left in relation to its position in the preceding correlation function or pulses may be dropped from the regular series of count pulses to lengthen the time period for a complete count to effectively move the tracking gates to the right.

If a decision is made to move left, the decision flip-flop 43 is placed in its set condition. An advance pulse from the last stage of the position counter 33 is then delivered to the reset terminal of the decision flip-flop 43 at the end of a position counter cycle. The switching of the decision flip-flop 43 to its reset state generates a pulse which is delivered to the set terminal of an "add-two" flip-flop 44 causing it to assume the set condition. This add-two flip-flop 44 is quickly returned to its reset condition by the add phase pulse from the divider by bistable 32, which occur at the 1.23 megacycle rate. The resetting of the add-two flip-flop 44 generates a pulse which is delivered both to the OR circuit 36 at the input of the position counter and through the OR circuit 45 to change an "add-one" flip-flop 46 to its set condition. The add-one flip-flop 46 is also quickly reset by the add phase pulse, and the reset thereof produces a pulse which is delivered through the OR circuit 36 to the position counter 33.

The normal series of pulses which are counted by a position counter are generated by the drop phase of the 1.23 megacycle pulses from the divider bistable 32 whereas the add phase generates the pulses produced for adding to the normal series; thus the add pulses are sandwiched in between two normally occurring drop phase pulses. It is to be noted that a decision made to move left actually adds two pulses to the regular count pulse series, one from the add-two flip-flop 44 and one from the add-one flip-flop 46. Pulses may also be added to the normal count pulse series through the OR circuit 45 by means of an external add pulse source 47 or by use of a slew switch 48, which taps one stage of the position counter to deliver pulses at approximately 600 cycles per second to move the gates quickly to the left.

When a decision is made to move right, the decision flip-flop 43 is not set, and neither the add-two flip-flop 44 nor the add-one flip-flop 46 generates a pulse. Thus it should be noted that two extra pulses are added to the normal count pulse series for each decision to move left, which has the effect of moving the gates two steps left and a decision to move right moves the gate not at all. This corresponds to a movement left of one step for a left decision or a movement right of one step for a right decision when these movements are superimposed upon a constant movement of one step left each decision. This constant one step left per decision is necessary for the rate compensation feature of the tracker and will be later explained in detail. If the tracker is operating properly to maintain the tracking gates at the proper position in the correlation function, the number of decisions to move left will be approximately equal to the number of decisions to move right; this condition corresponds to a constant move to the left of one pulse position.

The left gate from the left gate flip-flop 39 is a square wave pulse of 52 microseconds duration whose trailing edge is used to trigger the setting of the right gate flip-flop 41. This left gate pulse is applied to the AND gate 49 to hold it open for the duration of the gate. During such gate duration, the pulses indicating agreement of polarity from a coincidence circuit 15, such as that shown by way of explanatory example in FIG. 1, are allowed to pass through the AND gate 49 to the OR gate 51 and then to the decision counter 52 wherein each pulse is counted. The right gate pulse generated by the right gate flip-flop 41 is delivered to another AND gate 53, which is opened thereby to allow the passage therethrough of the pulses produced in the anti-coincidence circuit 16 of the correlator. The pulses from the anti-coincidence circuit 16 represent the number of disagreements in polarity occurring in the correlator function during the time period of the right gate pulse and these pulses are likewise fed through the OR gate 51 to be counted by the decision counter 52. The decision counter 52 consists of a number of separate binary stages for counting the incoming pulses and the entire counter is reset to the zero count by the trailing edge of the reset pulse which is generated by the reset flip-flop 42 when applied to the reset terminal 54.

Assuming now, as aforesaid, that the correlator for which the rate tracker is designed compares the pulse trains from two time series circuits such as the stationary and moving time series of sampling channel A 12 and storage channel 14 at a 9.84 megacycle rate and that a complete correlation function is generated at the rate of 37.6 cycles per second, then for a 52 microsecond gate width, there are 512 possible agreements and disagreements which will occur during that period of time. In order to count this total number of 512 the decision counter 52 must be 10 binary stages long; actually the decision counter is made 13 binary stages long with an output terminal from each of the last four stages. A movable tap 55 is mechanically coupled to the gate width tape 38 so that when the width of the gate is doubled by choosing a later stage of the position counter 33 to reset the gate flip-flop, the decision counter will have additional count capacity for the increased number of possible agreements and disagreements.

Now should the total count within the decision counter 52 during the left gate and right gate pulses exceed the total count provided for therein, a pulse will overflow the last stage and be delivered through the tap 55 to set the decision flip-flop 43 thus making a decision to move left as aforementioned. An external decision to move left can be accomplished by using the multiple contact switch 56 to disconnect the set terminal of the decision flip-flop 43 from the decision counter 52 and to connect it directly to the last stage of the position counter 33 so that the decision flip-flop 43 will be set for each complete count of the position counter at a rate of 37.6 cycles per second. The switch 56 may also be moved to a position wherein it receives pulses neither from the decision counter 52 nor from the position counter 33 and will thus make no decisions to move left.

It is helpful to consider the theory involved in the normal operation of the rate tracker wherein the switch 56 is connected to the decision counter and the set terminal of the decision flip-flop 43. In the prior correlation function tracker, it was necessary that the pulses produced by the coincidence and anti-coincidence circuits be smoothed to obtain an analog correlation function. This tracker then measured the area of the correlation function in the left gate against the area occurring during the right gate and produced a decision in accordance with which area was the larger. However, the number of agreements (or disagreements) in an interval of time is essentially proportional to the area of the analog correlation function for that time interval, and thus the present invention obviates the necessity for converting first to analog form for measuring areas. The difference in the number of agreements occurring in two consecutive periods of time, for example the left and right gates, is proportional to the difference in the areas within the gates when converted to analog form. If A is the number of agreements and A' the number of disagreements occurring in the left gate, then $A + A'$ equals T, T being the total number of comparisons occurring during the gate duration. Similarly, if B and B' represent the agreements and disagreements respectively in the right gate, then $B + B'$ equals T. If A—B is greater than zero, there is more "area" in the left gate and a decision should be made to move left to bring the gates into proper alignment. However, ($A-B = A-T + B'$), and the requirement that $A + B'$ be greater than T is equivalent to requiring that A—B be greater than zero for a left decision. The decision counter 52 is thus a resettable counter T units long and is built to count $A + B'$; overflow from this counter through the switch 55 constitutes a decision to move left, and no overflow means to move right. When $A + B'$ is exactly equal to T, the gate moves left since the tap 55 is attached to the last stage. The effect of this arbitrary decision is later explained.

After the occurrence of both the left and right gate pulses, the decision flip-flop 43 is in its set state if there has been an overflow from the decision counter; or it is in its reset state due to the previous action of the advance pulse from the last stage of the position counter 33. The decision flip-flop 43 consists, as do the other flip-flops, of two identical halves which are cross connected so that when one half is in a high voltage state the other half maintains a low voltage state. When a pulse is applied to the appropriate half, the two halves will interchange states. The two halves may be arbitrarily labeled the set and the reset halves of the decision flip-flop 43, and are connected separately to a rate counter 57 in a manner to be later explained. The rate counter 57 consists of ten reversible binary counter stages connected so that an incoming pulse may be either added or subtracted from the total count, as is well known in the art. The set and the reset outputs of the decision flip-flop 43 are connected to separate transfer buses which control groups of diode gates between the stages which in turn determine whether the next incoming pulse will be added or subtracted from the total count existing in the right counter 57. The pulses into the rate counter 57 are obtained from the trailing edge of the reset pulse generated by the reset flip-flop 42 and are connected to the counter input. The rate counter 57 may be a transistorized reversible counter as illustrated in FIG. 3 or any reversible counter presently well known in the art. The last five stages of the rate counter 57 have the outputs thereof connected to control five different AND gates which are effective to pass pulses of different frequencies to an OR gate 61. Each of the binary stages of the rate counter 57 have a "1" and a "0" condition, much like the set and reset conditions of the flip-flops to which they are similar. It will be assumed that the "1" condition of a stage is effective to maintain the respective AND gate open to the incoming frequency. The last stage 62 of the rate counter 57 controls the AND gate 63 which gates the 37.6 cycle per second advance pulses from the output of the position counter through a buffer 70. The buffer 70 produces short duration pulses at the leading edge of each advance pulse, that is connected to the input of the OR gate 61. These 37.6 cycle per second advance pulses are then fed to a four stage frequency divider 64 which reduces the frequency of the pulses by a factor of two in each stage and provides the output therefrom to appropriate AND gates. These counter stages are simply bistable circuits connected one to the other wherein the trailing edge of each overflow pulse from each stage corresponds with a change in the state of the next stage and the leading edge thereof corresponds to the production of a short duration pulse. This use of the trailing edge to get the next stage and the leading edge to produce short duration pulses allows pulses of different frequencies to be generated which are not coincident in time. Thus the first stage 65 of the frequency divider 64 delivers short pulses at an 18.8 cycle per second rate to the second AND gate 66, which is controlled by the second to last stage of the rate counter 57. The second stage 66 of the voltage divider produces pulses at 9.4 cycles per second which are gated through the AND gate 69 under the control of the third to last stage 71 of the rate counter. The last two stages 72 and 73 of the voltage divider produce pulses at 4.7 cycles per second and 2.3 cycles per second respectively to be gated through the AND gates 74 and 75 under the control of the fourth to last stage 76 and the fifth to last stage 77 respectively of the rate counter. The pulses through each of the AND gates are passed through the OR gate 61 to set the drop flip-flop 34. Setting drop flip-flop 34 closes AND gate 35 so that the next pulse from divider 32 does not pass through the AND gate 35. This pulse from divider 32 resets the flip-flop 34, thus opening the AND gate 35. Therefore a single pulse is removed from the normal series of drop phase pulses which are counted by the position counter 33 each time the drop flip-flop 34 is reset. Thus by dropping a single one of the incoming drop phase pulses the position counter 33 requires a single pulse cycle longer than normally in completing a full count and the gates are effectively moved to the right.

The gates may also be moved quickly to the right by connecting the slew switch 48 to the OR gate 61 in order to deliver pulses thereto at 600 cycles per second thus causing sixteen pulses to be dropped during a full count of the position counter 33. An external drop pulse source 78 is also connected to the input of the OR gate 61 so that arbitrary numbers of drop pulses may be delivered to the drop flip-flop 34 when conditions would require such. The slew switch 48, which provides for quick movement of the gate either to the right or to the left, the external add pulse source 47, and the external drop pulse source 78 are provided so that the gates may be originally moved into close proximity with the desired portion of the correlation function. Also provided is a source of potential 79 and a switch 81 connected to the last five stages of the rate counter 57 to reset the rate counter to the condition in which only the last stage 62 is in the one condition; at the termination of one tracking operation the rate counter may thus be reset to an original condition to commence another rate tracking operation at an initial drop frequency of 37.6 pulses per second.

It is helpful in the understanding of the operation of this invention to consider the detailed circuit diagram of FIG. 3 wherein like reference numerals refer to like elements found in the block diagram of FIG. 2. The details of each kind of circuit included in the detailed circuit diagram of FIG. 3 will not be explained in detail since the functions of these type circuits and the operation thereof are well known in the art and are not necessary to a complete understanding of the invention. The last five stages of the rate counter comprise five bistable circuits 62, 67, 71, 76, and 77 arranged in reversible counter fashion. Each bistable circuit, such as stage 71 has one half connected through a diode gate such as 82, in subtracting relationship with the following stage, such as stage 67, in the well known manner. The other half of the bistable rate counter stage, such as 71, is connected through another diode gate, such as gate 83, in an additive relation with the next stage, such as stage 67. The voltages appearing on the subtract bus 58 and the add bus 59 determine which one of the two diode gates, such as 82 or 83, will be effective to pass pulses between the adjacent stages thus determining whether the next incoming pulse will be added or subtracted. Now the first half of each of these last five rate counter bistable circuits is connected to transfer the voltage level thereof to control its respective diode gate as before explained. When the left half of any particular rate counter stage is conducting, then the respective one of the diode gates 63, 66, 69, 74 and 75 is maintained open to pass positive pulses therethrough to the AND gate 61.

The positive pulses are obtained initially from the position counter 33 whose last stage delivers square wave pulses to the buffer 70 which develop, in a well known manner of capacitor differentiation, positive pulses corresponding to the leading edge of each advance pulse. The square wave pulses from the position counter 33 are also connected to a four stage binary frequency divider each of which is triggered to one state or the other by the trailing edge of each of the square wave pulses from the preceding stage. One of the halves of each of the bistable circuits comprising the frequency divider is connected through a differentiating capacitor to a respective diode gate to produce a positive pulse on the leading edge of each pulse output therefrom. This arrangement, as aforesaid, produces pulses through each of the diode gates at five different frequencies from 37.6 pulses per second to 2.4 pulses per second and none of the pulses overlap so that each separate pulse produces a pulse output from the OR gate 61 to the set terminal of the drop flip-flop 34.

The right half output of each of the rate counter last five stages 62, 67, 71, 76 and 77 are connected through the respective resistors 84 through 88 to the base of an amplifying transistor 89 whose voltage output is connected to an indicating voltmeter 91. Each of the resistors 84 through 88 is approximately twice the size of the preceding resistor taken in numerical order, thus the resistor 88 has 16 times the resistance value of the resistor 84. In this manner an analogue voltage proportional to the binary count contained in the last five stages is delivered to the base of the transistor 89 to control the conduction thereof. The conduction of the transistor 89 in turn determines the indication of the voltmeter 91 thereby giving an analog representation of the rate of tracking contained in the last five stages of the rate counter. The transistor 89 and the voltmeter 91 constitute elements of a rate meter 92, as shown in FIG. 2.

Since a pulse added or dropped from the normal series of 1.23 megacycle drop phase pulses changes the tracking gate position 0.8 microseconds, a drop frequency of 37.6 pulses per second corresponds to a rate of change of position of 30 microseconds per second. The rate counter 57 controls drop frequencies over a range from 0 to 72.9 pulses per second since the pulses controlled by each state are cumulative. However, 37.6 pulses per second are effectively being added constantly as previously explained, and thus the net range of the rate tracker is from 37.6 pulses per second added to 35.2 pulses per second dropped. This means that the rate tracker is capable of following rates of movement of from 30 microseconds per second to the left to 28.2 microseconds per second to the right in increments of 1.9 microseconds per second.

If it is desired to operate the tracker without rate correction, the reset pulse can be interrupted by opening the switch 93 which normally connects the output of the reset flip-flop 42 to the input of the rate counter 57.

The 1.23 megacycle pulse rate into the position counter determines the step size of approximately 0.8 microseconds, and the decision period, that is the total count of the position counter, is 0.026 seconds. Thirty-two net decisions in one direction are required to change the state of the sixth stage 77 of rate counter, which controls the lowest frequency of 2.4 pulses per second input to the drop circuit. This 2.4 pulses per second represents a rate of 0.8 times 2.4 or 1.9 microseconds per second. Thus the effective rate step size is 1.9 divided by 32 or 0.06 microseconds per second for one rate decision, although the smallest step actually taken is 32 times this. This is because if the 2.4 pulse per second frequency is too great a correction in the rate, then the next succeeding decision will be to remove one count from the rate counter 57 thereby removing the 2.4 pulse per second rate.

With rate compensation, the average lag in tracking the correlation function will be zero. However if the actual rate is not an integral multiple of 1.9 microseconds per second, the rate circuits must alternate between two states to make the average rate estimate equal to the actual rate. Thus the estimated rate will always differ from the actual rate, and the average magnitude of the error in rate compensation (averaged over time for a given actual rate, and over all rates) will be 0.6 microseconds per second, or one-third of the smallest step used in rate compensation (in this case 1.9 microseconds per second). This error in rate compensation shows up in the output of the tracker as a variation of the output position about its mean value, although the average lag is zero. This variation is not related to the statistical variation of the output due to input noise as in the prior tracker, but is caused by the coarseness of the rate steps. Also there is a slight tendency towards oscillation of the tracker output about its mean value when large deviations appear in the input voltage to the correlator circuit such as caused by low signal-to-noise ratios in the input sources. This tendency toward oscillation, which is common to all second order servos, is caused by the dynamic characteristics of the feedback in the tracker, and is not in any way related to the rate compensation error which is produced by the coarseness of the rate varying corrections.

A bias error is also introduced in this tracker due to the arbitrary decision made in the case where there is actually no error. If the number of agreements in the left gate exactly equals the number in the right gate, which is the case when the gates are exactly positioned, the decision counter 52 will be exactly full but, since a pulse is delivered to the decision flip-flop 43 in this case, the tracker treats this as though the left gate contained a larger number and moves left. Thus the probability of moving the gate left is increased slightly over that of moving right, and the tracker will move off of the correlogram function position to compensate for it.

For a small signal-to-noise ratio in the input signals, the probability of the occurrence of an agreement or a disagreement pulse approaches one half. This introduces a slight lag to the left due to the arbitrary decision. Now this particular lag due to bias has a definite average value to the left whereas the other lag due to coarseness of correction had an average value of zero. In some cases the magnitude of the lag is sufficient to be worth noting, but is not intolerably large in most instances. This bias can be eliminated either by producing a zero decision when the decision counter 52 is exactly full or by letting the gates move alternately or statistically in either direction with equal relative frequency when this case occurs.

Figure 4:
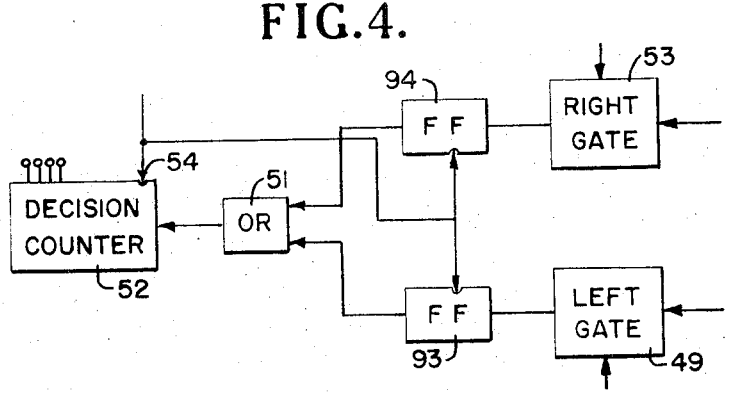
FIG. 4 is an illustration of a modification of the automatic rate tracker of FIG. 2.

The modification of the rate tracker shown in FIG. 4 removes this bias by making a statistical decision to move one way or the other each time this case occurs. This is accomplished by removing the first stage of the decision counter 52 and substituting between each of the gates 49 and 53 a binary counter stage, which is resettable after each correlation function as are those in the decision counter; between the left AND gate 49 and the OR gate 41 is the binary counter stage 93 which is a bistable type counter stage; and between the right gate 53 and the OR gate 51 is the binary counter stage 94. In the special case when the total number of input pulses through the gates 49 and 53 is equal to T, which is always an even number, two possible conditions may occur. Either the respective inputs through the two gates are both even or they are both odd. If they are both even, the total number of pulses into the shortened decision counter will be A divided by 2 plus B' divided by 2 or $((A+B')/2)$ if they are both odd, the total number into the decision counter is $(A-1)/2$ plus $(B'-1)/2$ or $((A+B')/2)$ minus 1. Thus since the decision counter is shortened by one stage, it will overflow in the first case and not in the second; even though in each case $A+B'$ is equal to T. Also it is evident that the shortened decision counter will overflow at any time that $A+B'$ is greater than T and will not overflow when $A+B'$ is less than T. It is further evident that A and B' have equal probabilities of being even or odd. Therefore the tracker will move left or right in the case where the gates are correctly positioned with equal probability, and the bias thereby eliminated.

The position of the left and right gate is indicated by the action of a position flip-flop 95 whose reset terminal is connected to the output of the left gate flip-flop 39 to be reset by the trailing edge of the left gate pulse. The position flip-flop 95 is placed in its set condition by a pulse from the transfer pulse source 96, which develops a pulse in time coincidence with the beginning of each correlation function; this transfer pulse may be obtained from an independent timing source or from appropriate connection to the correlator circuit. Thus the position flip-flop 39 is in its set condition at the beginning of the correlation function and is only returned to its reset condition by the trailing edge of the left gate pulse. The position of the gates is then shown on an appropriate position indicator 97, which is effective to translate the length of the pulse produced by placing the position flip-flop in its set condition into an analog reading of that time position.

Much of the invention has been shown in block diagram form to aid in the simplicity of presentation of the essential elements of this invention. A detailed explanation of each and every component of this invention is considered unnecessary since many well known circuits may be employed in the invention to perform the necessary operations as set forth in the block diagrams and the descriptions thereof.

Whereas the invention has been described with reference to a specific example which gives satisfactory results, it is not so limited as, for example, the movements of the tracking gates due to the position and rate decisions may each be bidirectional, if so desired, rather than unidirectional as in the embodiment described herein.

It will be understood that various changes in the details, material and arrangements of parts, which have been herein described and illustrated in the different embodiments, in order to explain the nature of the invention, may be made by those skilled in the art within the principle and scope of the invention, as expressed in the appended claims.

What is claimed is:

1. An automatic rate tracker for tracking the position of a signal peak occurring in successive signal cycles comprising gate generating means for producing a gate pulse once each signal cycle, decision means for determining the position of said gate pulse in relation to said signal peak and for producing an error signal when said gate pulse is to one side of said signal peak, first position changing means connected to said decision means and said gate generating means, said first position means being responsive to said error signal to move said gate pulse towards said peak by a predetermined time interval in one direction, second position changing means for changing the position of said gate at given predetermined rates in the other direction, and rate changing means connected to said decision means and to said second position changing means to vary said rates in response to the frequency of occurrence of said error signal, whereby said signal is automatically tracked.

2. The automatic rate tracker of claim 1 wherein said second position changing means includes means for changing the position of said gate by predetermined time intervals in said other direction, said predetermined time intervals in said other direction being one half the amount of said predetermined time interval in said one direction.

3. The automatic rate tracker of claim 1 wherein said gate generating means comprises pulse counting means for counting regularly occurring timing pulses, wherein said first position changing means comprises add gate means for adding a predetermined number of additional pulses to said regularly occurring timing pulses, and wherein said second position changing means comprises drop gate means for excluding of said regularly occurring timing pulses at given predetermined rates, whereby said gate pulse is generated earlier during a signal cycle when pulses are added and later when pulses are excluded.

4. The automatic rate tracker of claim 3 in which said signal peak corresponds to the exact position of maximum correlation in a correlation function and said successive signal cycles are obtained from a correlation circuit for comparing polarity sample pulses which are equally spaced and indicative of the polarity of two input waveforms, said correlation circuit producing a coincidence or a non-coincidence pulse for each comparison, wherein said gate generating means further comprises gate timing means for generating a pair of gate intervals of equal time duration on either side of the approximate position of maximum correlation, and said decision means comprises coincidence gate means connected to said timing means for passing a coincidence pulse therethrough for each polarity coincidence of two polarity sample pulses occurring during one of said gate intervals, anti-coincidence gate means connected to said gate timing means for passing a non-coincidence pulse therethrough for each polarity non-coincidence occurring during the other of said gate intervals, decision counter means being connected to said coincidence and anti-coincidence gate means to count the pulses passed therethrough, whereby the number of pulses counted by said counter during said first and second gate intervals is indicative of the position of said gate intervals with relation to said maximum correlation position.

5. The automatic rate tracker of claim 4 wherein said decision counter means has a total count capacity equal to the number of comparisons made by said correlation circuit during one of said gate intervals, said decision counter producing an overflow signal when the number of pulses counted thereby exceeds said capacity, whereby said overflow signal indicates that said maximum correlation is in a given direction from said approximate position.

6. The automatic rate tracker of claim 1 wherein said second position changing means comprises a plurality of pulse sources, each of said sources having a different pulse frequency, the pulses from said plurality each occurring at a different time interval, a plurality of gates, rate counter means having a plurality of separate stages to register a number therein and each of said stages having an output signal therefrom indicative of the count contained therein, a plurality of frequency gates each connected to a respective one of said stages to be opened or closed by the output signal therefrom, said plurality of pulse sources each being connected to a respective one of said gates to pass pulses therethrough when said respective gate is opened, and pulse collecting means connected to each of said frequency gates to receive the pulses passed therethrough whereby the frequency of the pulses received by said pulse collecting means is varied by changing the number registered in said counter means.

7. In a signal position determining means for determining the exact position of the maximum correlation in a correlation function signal cycle obtained from a correlation circuit for comparing equally spaced pulses indicative of polarity samples of two different input waveforms, said correlation circuit producing a coincidence or a non-coincidence pulse for each comparison, decision circuit comprising gate timing means for generating a pair of gate intervals of equal time duration on either side of the approximate position of maximum correlation, coincidence gate means connected to said timing means for passing a coincidence pulse therethrough for each polarity coincidence occurring during one of said gate intervals, anti-coincidence gate means connected to said timing means for passing a non-coincidence pulse therethrough for each polarity non-coincidence occurring during the other of said gate intervals, decision counter means being connected to said first and second gate means to count the pulses passed through both said gates, whereby the number of pulses counted by said counter means during said first and second gate intervals is indicative of the position of said gate intervals with relation to said maximum correlation position.

8. The decision circuit of claim 7 wherein said decision counter means has a total count capacity equal to the number of comparisons made by said correlation circuit during one of said gate intervals, said decision counter means producing an overflow signal when the number of pulses counted thereby exceeds said capacity, whereby said overflow signal indicates that said maximum correlation is in a given direction from said approximate position.

* * * * *